Inventor:
Horst Bachmann
Hans-Dieter Schneider
Emil Sennhenn
by Michael S. Striker
Attorney Inventor:
Horst Bachmann
Hans-Dieter Schneider
Emil Sennhenn
by Michael S. Striker
Attorney Inventor:
Horst Bachmann
Hans-Dieter Schneider
by Emil Sennhenn
Michael S. Striker
Attorney Inventor:
Horst Bachmann
Hans-Dieter Schneider
by Emil Sennhenn
Michael S. Striker
Attorney Inventor:
Horst Bachmann
Hans-Dieter Schneider
Emil Sennhenn
by Michael S. Striker
Attorney Inventor:
Horst Bachmann
Hans-Dieter Schneider
by Emil Sennhenn
Michael S. Striker
Attorney

United States Patent Office 3,435,136

Patented Mar. 25, 1969

3,435,136

ARRANGEMENTS FOR INDICATING THE STATE OF ADJUSTMENT OF OPTICAL COMPONENTS IN A TELEVISION CAMERA

Horst Bachmann, Darmstadt, Hans-Dieter Schneider, Gross-Gerau, and Emil Sennhenn, Darmstadt-Arheilgen, Germany, assignors to Fernseh GmbH, Darmstadt, Germany Filed Oct. 22, 1965, Ser. No. 500,782
Claims priority, application Germany, Nov. 4, 1964, F 44,361
Int. Cl. H04n 5/38, 5/44
U.S. Cl. 178—6.8 10 Claims

ABSTRACT OF THE DISCLOSURE

An arrangement in which the diaphragm aperture and the focal length of the lens in a television camera may be remotely displayed on the screen of a television receiver or on the screen of the viewfinder on the camera. Potentiometers are mechanically coupled to the mechanisms which adjust and determine the positions of the diaphragm aperture and the focal length of the lens. The voltages provided by the potentiometers are used to modify the waveform of pulses so that the pulses are representative of the parameters being measured and to be displayed. The modified pulses are mixed into the video signal which is transmitted to the viewfinder on the camera or a remotely located television receiver. By applying a scale to the screen along an edge, the periodically appearing pulses on the screen provide a reading of either or both the diaphragm aperture and the focal length.

The present invention relates to an arrangement for indicating the state of adjustment of optical elements in a television camera and more particularly to an arrangement for indicating the state of adjustment of a diaphragm opening or the focal length of an objective with variable focal length or the focal length of one among several camera objectives.

It is a broad object of the present invention to provide a novel arrangement for indicating to the camera operator the state of adjustments of optical elements in a television camera.

It is a further object of the present invention to provide a novel arrangement for indicating to the camera operator the state of adjustments of optical elements in a television camera in a simple manner by means oft he electronic viewfinder of the camera and without the use of a meter.

According to the present invention there are provided means responsive to the adjustment of an optical element and delivering a voltage depending upon said adjustment. In dependence on this voltage the form or position of marker pulses is being altered and these marker pulses are mixed to the video signal and made visible on the screen of the electronic viewfinder.

In a preferred embodiment of the invention marker pulses are generated to characterize the existing adjustment of the diaphragm opening or the focal length of a lens. These marker pulses are mixed in with the video signal and made visible on the screen of an associated television display device. This manner of mixing in the indications is especially advantageous when the indications are not to be made visible on the screen of all the television display devices to which the video signal is fed. Thus in television studios it is suitable to make the indications visible on the screens of these display devices which are used as the electronic finder in the camera and a monitor in the vicinity of the control desk, whereas the indications would normally not be required to be visible on the screens of the domestic television receivers to which the video signals developed by the camera are fed.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIGURE 1 is a schematic representation of a television apparatus;

FIGURE 2 comprises a number of waveform diagrams such as appear in the apparatus described with reference to FIGURE 1;

FIGURE 3 comprises a number of waveform diagrams representing marker pulses such as may be used in carrying out the invention;

In all these drawings corresponding elements are designated by the same reference symbols.

Figure 1:
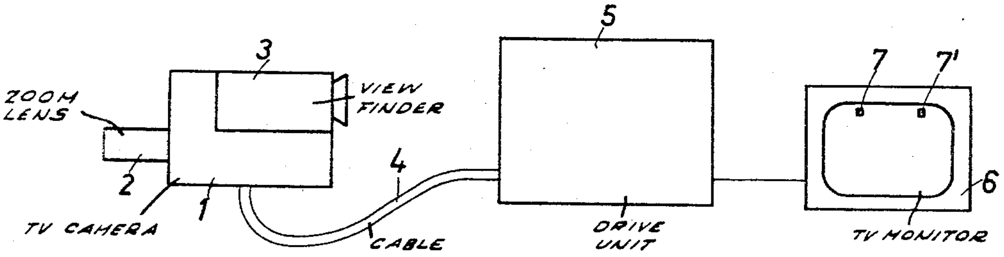

The television apparatus illustrated by FIGURE 1 consists of a television camera 1 with a zoom lens 2 and an electronic finder 3. The camera is connected by way of a multicore camera cable 4 to a drive unit 5, which in turn provides video signals to a monitor 6. A scene viewed by camera 1 yields a corresponding video signal which is fed to finder 3 and to monitor 6, in which images of the scene are reproduced. The drive unit 5 provides all the voltages necessary for the operation of the television camera 1. The lens diaphragm aperture and also its focal length may be adjusted during the course of television studio operation either by the cameraman or by some other operator. It is desirable for the cameraman and for the operators in the vicinity of the monitor 6 to be continuously informed of the actual state of adjustment of the adjustable diaphragm aperture and of the focal length of the lens. In accordance with the invention there are mixed in with video signal from the camera 1 which is fed to the finder 3 and to the monitor 5 marker pulses giving rise to indications such as those indicated by 7, 7', on the monitor screen, which allow the state of adjustment of the diaphragm and of the lens to be known. It would also be possible to employ an interchangeable lens (for example a lens mounted on a lens turret). The indication displayed on the screen of the electronic finder 3 and of the monitor 6 would then be arranged to display the aperture setting and the focal length of that lens which is actually in the operating position.

The indications 7, 7' may be numerals mixed optically or electronically with the picture signal, for example, by the use of optical means which image appropriate numerals on the photosensitive member of the television camera tube.

The indications 7, 7' may however, also be mixed in by purely electronic means, which are controlled in accordance with the instantaneous state of adjustment of the diaphragm aperture or lens focal length. The marker pulses thus produced are combined with the picture signal and displayed on the screens of the electronic finder 3 and of the monitor 6. These indications 7, 7' may be combined with the picture signal so as to appear at the upper, lower, right-hand or left-hand edge of the picture in such a manner that their positions indicate the state of adjustment of the diaphragm opening or the focal length of the lens. For example, an index may be mixed in at the top edge of the picture, the position of which may be varied in the horizontal direction along the whole width of the picture to indicate the state of adjustment of the diaphragm. In particular, such an indication may cooperate with a fixed scale provided adjacent the edge of the picture to indicate the variation of the relevant adjustment. A further indication may be provided by an index movable along the whole of the line in the horizontal direction at the lower edge of the picture to indicate the focal length of the lens. It would also be possible to cause each index to move over one half only of a television line at the same edge of the picture. In this manner the two indications would be movable in the horizontal direction alongside each other either at the top or at the bottom edge of the picture. It would, however, also be possible to mix in the indication at either the right or left-hand edge of the picture, the marker pulses then occurring at the beginning or at the end of the horizontal blanking intervals, and in this manner to indicate in conjunction with an appropriate scale either the diaphragm aperture or the focal length of the lens.

Figure 2:
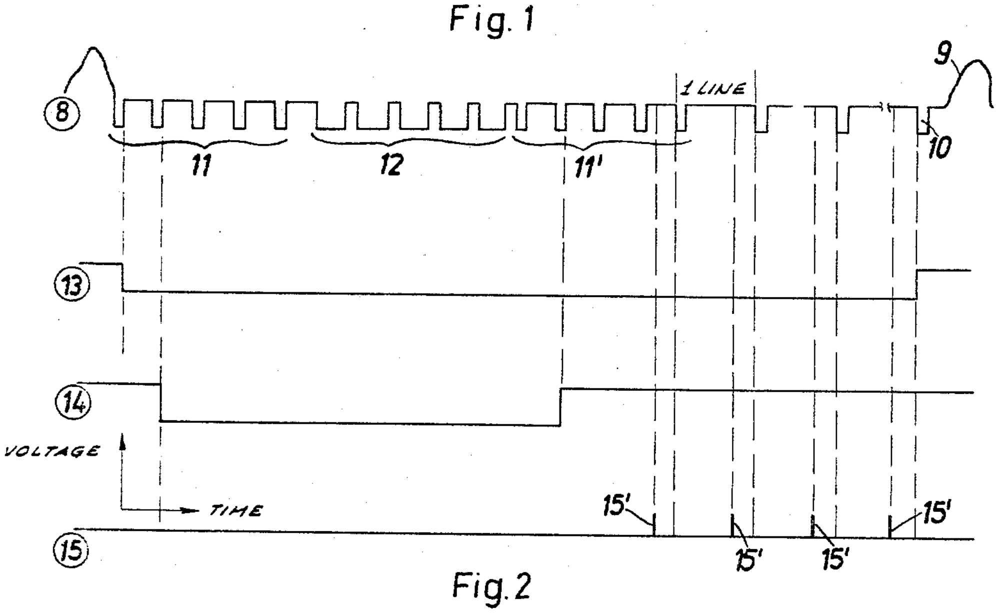
Figure 3:
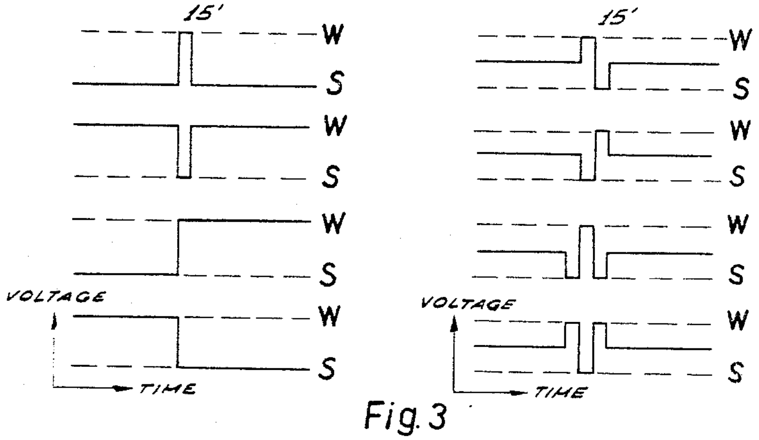

FIGURE 2 shows waveform 8 representing a television signal including a picture signal component 9, horizontal synchronizing pulses 10, first equalizing pulses 11, vertical synchronizing pulses 12 and second equalizing pulses 11'. The duration of the vertical blanking interval is equal to the duration of the vertical blanking pulse 13. The pulses shown by waveform 14 occur during the period of the vertical blanking pulse and are commonly produced in television transmitting apparatus independent of their use for the invention here described. The train of marker pulses represented by waveform 15 consists of a group of four individual pulses 15' in each field (and thus of eight pulses in each picture). It will in general be suitable to provide some four to eight pulses per field. These groups of individual pulses periodically repetitive at the field frequency conveniently lie just within the vertical blanking interval and thus appear at the upper edge of the picture. It would be possible to develop these pulses also wholly or partially outside the vertical blanking interval and thus within the normal picture area, preferably within the first five lines. The waveform diagram of FIGURE 3 shows a number of possible forms for the marker pulses 15' of which the signal level varies between the white level W and the black level S.

The marker pulses 15 may be developed by producing a control voltage proportional to the focal length or to the diaphragm setting (for example by the use of a potentiometer) and feeding this voltage to the drive unit 5 of FIGURE 1 by way of the camera cable 4. In the drive unit the marker pulses are generated and their timing is varied by means of the received control voltage. The marker pulses are then mixed in to the video signal which is fed back along the camera cable 4 to the electronic finder 3 and is also fed to the monitor 6.

Figure 4:
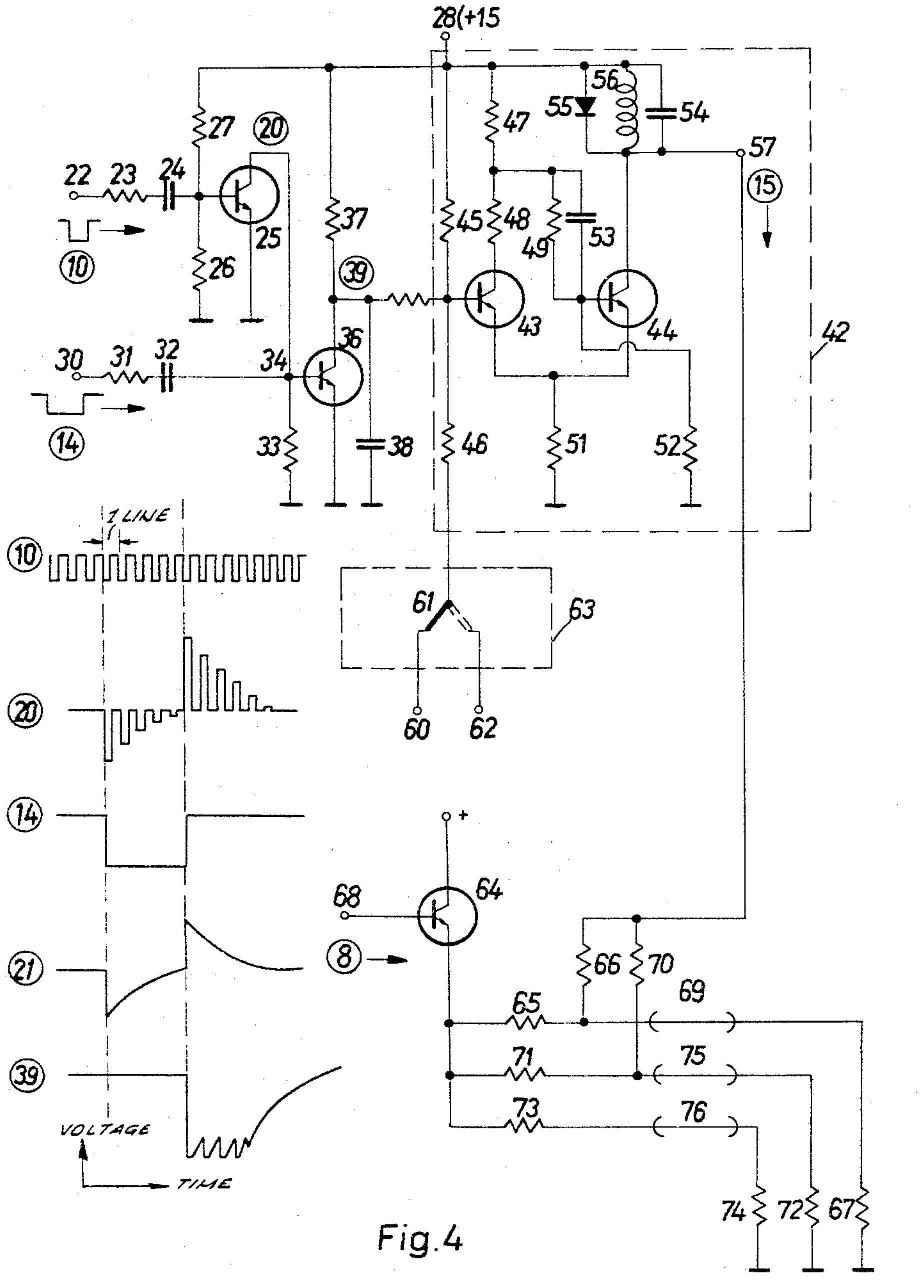
FIGURE 4 shows a circuit diagram of apparatus which may be used to generate marker pulses used in carrying out the invention.

The apparatus represented by the circuit arrangement of FIGURE 4 will be mainly within the drive unit 5 of FIGURE 1. It provides on the one hand for developing the marker pulses 15 and on the other hand for mixing these marker pulses with the video signal 8.

Horizontal synchronizing pulses 10 are received at a terminal 22 and are fed by way of a resistor 23 and a capacitor 24 to the base of a transistor 25. The base potential of transistor 25 is fixed by means of resistors 26 and 27 through which the base is returned to earth and to the positive terminal 28 of a 15-volt D.C. supply respectively.

A pulse 14 occurring during the vertical blanking intervals is received at a terminal 30 and is applied by way of a resistor 31 and a capacitor 32 across a resistor 33. The pulse is differentiated by the action of capacitor 32 and resistor 33 thus yielding a pulse as shown by waveform 21. Since circuit point 34 at the junction of capacitor 32 and resistor 33, is, however, connected to the collector of transistor 25, the pulse 21 acts as the operating voltage for transistor 25, so that there appears at the collector of this transistor the pulse train 20, which is applied from point 34 to the base of a further transistor 36. The collector of transistor 36 is taken to the +15 v. supply by way of a load resistor 37 and its emitter is earthed, while its collector-emitter path is shunted by a capacitor 38. The pulse train 20 applied to its base is thus converted to a serrated pulse of the waveform shown at 39, which is applied by way of a resistor 41 to a Schmitt trigger circuit designated generally by the reference 42.

Schmitt trigger 42 consists of two transistors 43, 44 of which the emitters are commoned. The base potential of transistor 43 is fixed by a resistor 45 through which the base is taken to the positive line and a resistor 46 through which the base is taken to a potential variable in accordance with the state of adjustment to be indicated. The load for transistor 43 is formed by two series-connected resistors 47, 48, the junction of which is coupled by the parallel combination of a resistor 49 and a capacitor 53 to the base of transistor 44. The commoned emitters of transistors 43, 44 are returned to earth through a resistor 51 and the base of transistor 44 is also returned to earth by way of a resistor 52. The load of transistor 44 is composed by the parallel combination of a capacitor 54, a diode 55 and an inductor 56. Signals appearing across this load are fed out by way of a terminal 57.

Trigger circuit 42 responds in known manner to the applied signal 39 to yield at terminal 57 the train of marker pulses 15 of FIGURE 2.

As already stated, the position of the marker pulses must be adjustable in accordance with the instantaneous adjustment of the diaphragm or the focal length. In the vicinity of the zoom lens 2 of FIGURE 1 there is provided a potentiometer coupled to the lens in such a manner that its setting changes in accordance with the changing focal length or the diaphragm setting of the lens. The potentiometer is connected across a suitable direct voltage source and the potential appearing at its slider is thus characteristic of the state of adjustment of the lens. This potential is fed by way of the camera cable 4 of FIGURE 1 to the drive unit 5, where it is received at a terminal 60 and applied thence by way of a switch 61, in the setting indicated in solid line, to the foot of resistor 46 so as to control the base of transistor 43, thus shifting the marker pulses in accordance with the applied voltage. If it is required to indicate the instantaneous state of adjustment of the diaphragm determining the lens aperture, in addition to the focal length, then a further control voltage characteristic of the diaphragm adjustment may be derived in an analagous manner. This further control voltage may be received at terminal 62 and applied by way of switch 61 when in the position shown in broken line to resistor 46 to control the position of the marker pulses. The mechanical switch 61 may be replaced by an equivalent electronic switch denoted by broken line 63. This switch may be arranged to change over at the field frequency, so that the marker pulses controlled by the focal length of the lens and the diaphragm adjustment appear effectively simultaneously on the screen of the finder and of the monitor. The respective marker pulses are arranged to appear in the right-hand and in the left-hand half of the picture and to persist for several lines.

The marker pulses appearing at terminal 57 are mixed with the video signal in the manner illustrated in the lower part of the figure. The video signal 8 is received at a terminal 68 and is applied to the base of an emitter-follower transistor 64 from the emitter of which the video signal is fed out by way of decoupling resistors 65, 71, 73 and cable cores 69, 75, 76 to individual load resistors 67, 72, 74. The marker pulses are fed in by way of resistors 66, 70 which are taken respectively to the junction of resistor 65 with cable core 69 and to the junction of resistor 71 with cable core 75. Video signals with superimposed marker pulses thus appear across resistors 67 and 72 and are fed thence to the finder 3 and to monitor 6, whereas a video signal without marker pulses appears across resistor 74. In this manner the marker pulses appear on the screens of the monitor and of the finder, but not on the screens of those television receivers to which is supplied usually by way of a television broadcast transmitter, the video signal appearing across resistor 74.

Figure 5:
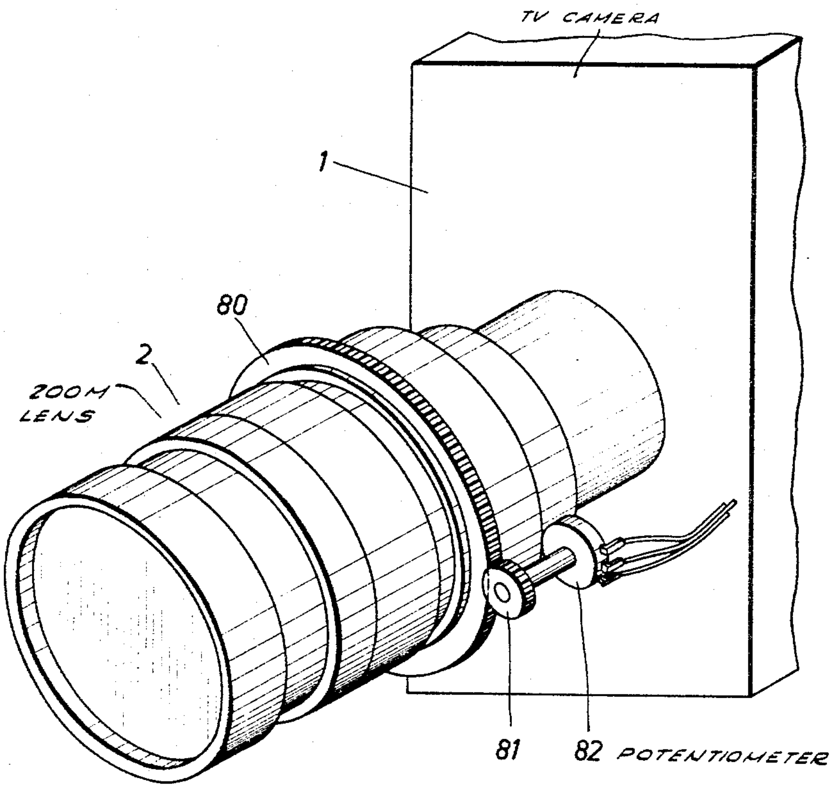
FIGURE 5 is a perspective view of a zoom lens provided with a potentiometer coupled to the adjusting mechanism for the diaphragm or the focal length.

FIGURE 5 shows a perspective view of a zoom lens adapted for use in television apparatus according to the invention. A toothed ring 80 which surrounds the lens may be rotated to adjust the diaphragm setting or the focal length. A gear-wheel 81 engaged with ring 80 rotates the shaft of a potentiometer 82 as ring 80 is adjusted. In this manner there may be taken from the potentiometer a voltage which is characteristic of the instantaneous state of adjustment of the diaphragm or of the focal length of the lens. This voltage is applied to the terminal 60 or 62 of the circuit arrangement described in relation to FIGURE 4.

Figure 6:
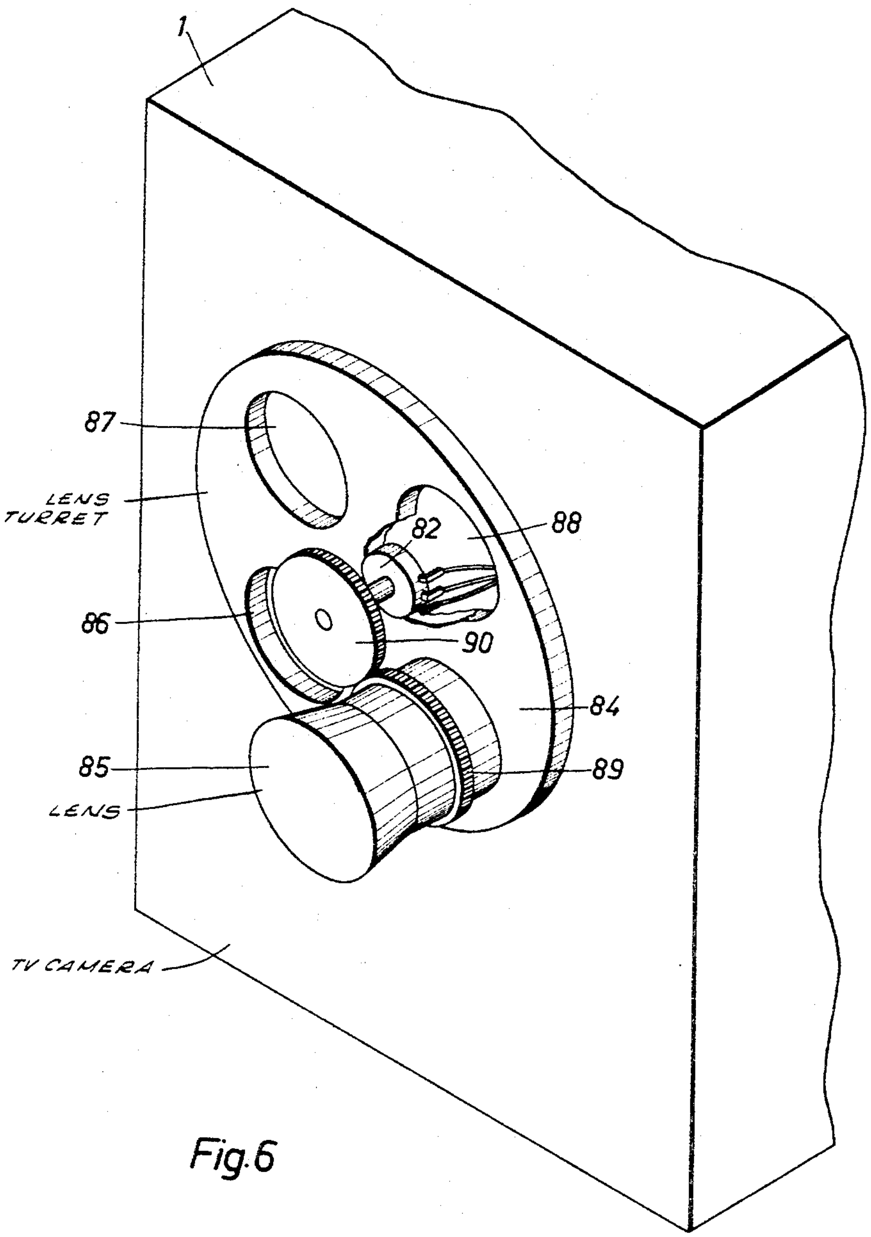
FIGURE 6 shows how a potentiometer may be coupled with the diaphragm adjustment of a lens carried on a lens turret.

FIGURE 6 shows an interchangeable lens coupled with a potentiometer for indicating the diaphragm setting. On a lens turret 84 there are in practice arranged, in addition to the lens 85 in the operating position, other lenses mounted in apertures 86, 87, 88 which are omitted for the sake of clarity in illustration. Lens 85 is provided with an adjusting ring 89, rotation of which adjusts the stop setting of the diaphragm. The instantaneous setting of ring 89 is transmitted by way of a gear-wheel 90 to the shaft of a potentiometer 82, from which there may thus be derived a voltage which is characteristic of the state of adjustment of the diaphragm. The diaphragm adjusting rings of the remaining lenses (not shown) are likewise continuously in engagement with the gear-wheel 90. The voltage taken from the potentiometer 82 may likewise be applied to the terminals 60 or 62 of FIGURE 4.

Figures 7, 8:
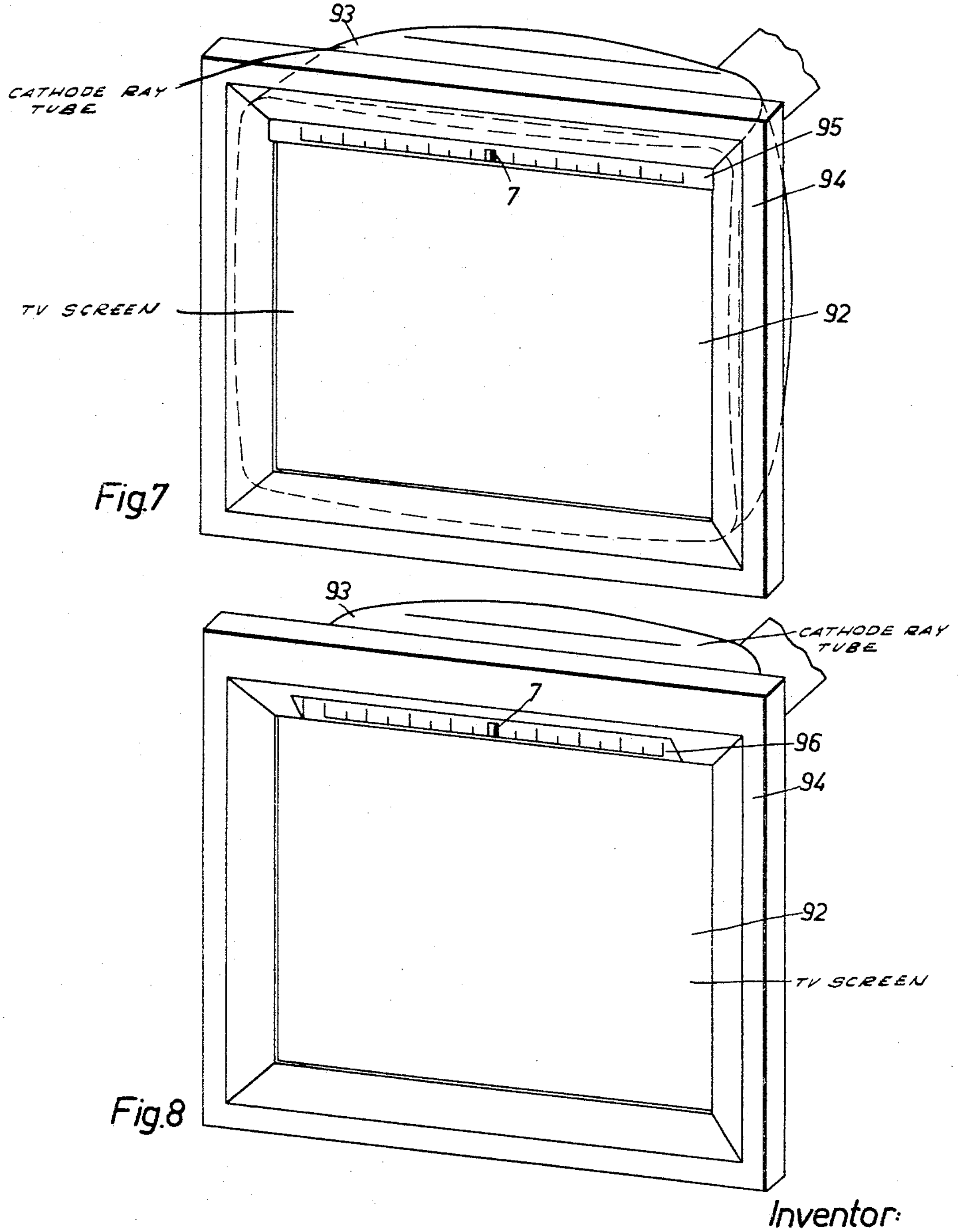
FIGURES 7 and 8 show how the invention may appear on the screen of a television display unit.

FIGURES 7 and 8 represent the screens of television display devices, on each of which an index 7 is visible. The cathode ray tube screen 92 and the front end of the cathode ray tube 93 is surrounded by a frame 94 which is shown as provided with a scale 95 of one form in FIGURE 7 and with a scale 96 of a different form in FIGURE 8. The index 7 is mixed-in so as to appear within the normal television image (which has an aspect ratio 3:4) and the scale 95 therefore covers the first few lines on this normal television picture. In FIGURE 8, on the other hand, the scale 96 is arranged outside the normal television picture area to suit an indication occurring outside the normal television image towards the end of the vertical blanking interval. The scales 95 and 96 of FIGURES 7 and 8 may be calibrated in values of diaphragm aperture or of focal length, so that as the indicator 7 shifts in the horizontal direction the state of adjustment of the diaphragm or the focal length may be read off directly.

Figure 9:
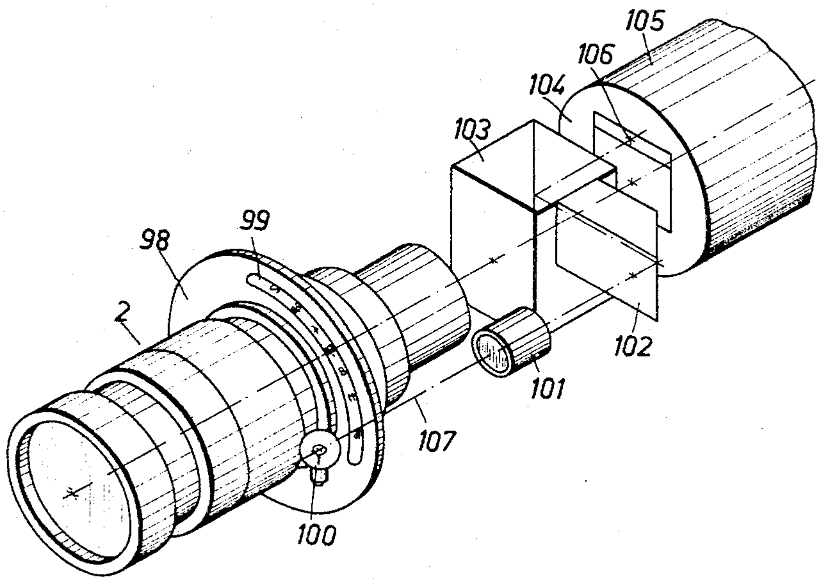
FIGURE 9 shows apparatus whereby an indication may be optically mixed into a television picture signal.

FIGURE 9 shows a zoom lens 2 and optical means for mixing into the television picture a numeral representative of the state of adjustment of the lens. It is assumed that the ring 98 is rotated in accordance with the adjustment of the diaphragm or the focal length of the lens. In ring 98 is a slot provided with a transparent numbered scale 99. This is illuminated by a lamp 100 and the scale portion so illuminated is imaged by means of a lens 101 and prisms 102, 103 on to the photosensitive element 104 of a television pickup tube 105. Thus there appears as a strip 106 along the top edge of the picture an image of that part of the scale 99 which is aligned with the optical axis 107 of lens 101.

While the invention has been illustrated and described as embodied in an arrangement for indicating the adjustment of an optical element it is not intended to be limited to the details shown, since various modifications and structural changes may be made without departing in any way from the spirit of the present invention.

What is claimed as new and desired to be secured by Letters Patent is:

1. An arrangement for indicating the adjusted state of the diaphragm aperture in a television camera providing a video signal comprising, in combination, an electronic viewfinder in said television camera; potentiometer means mounted on said camera and mechanically coupled to said diaphragm for providing a voltage representing the state of said diaphragm aperture; pulse generating means connected to said potentiometer means and emitting pulses with waveform dependent upon said voltage from said potentiometer; mixing means connected to said pulse generating means for mixing said pulses and said video signal and providing thereby a mixed signal; connection means between said mixing means and said viewfinder for applying to the edge of the viewing screen of said viewfinder a visual indication of said pulses; and scale means at said edge of said viewing screen and cooperating with said pulses so that the adjusted state of said diaphragm may be read from said scale.

2. The arrangement for indicating the adjusted state of the diaphragm aperture as defined in claim 1 including timing means in said pulse generating means for producing said pulses within the duration of the vertical blanking pulse in said video signal.

3. The arrangement for indicating the adjusted state of the diaphragm aperture in a television camera as defined in claim 2 wherein said pulses emitted by said pulse generating means occur shortly before the end of said vertical blanking pulse.

4. The arrangement for indicating the adjusted state of the diaphragm aperture in a television camera as defined in claim 1 including further potentiometer means mechanically coupled to the focal length adjustment mechanism of the lens of said television camera and providing a voltage representing the focal length of said lens, the electrical output of said further potentiometer means being applied to said pulse generating means for producing pulses with waveform modified by said voltage representing said focal length and thereby providing pulses indicative of said focal length, said pulses indicative of said focal length being also applied to an edge of said viewing screen of said viewfinder so that a visual indication of said focal length of said lens is obtainable from said viewing screen.

5. The arrangement for indicating the adjusted state of the diaphragm aperture as defined in claim 1 including television receiving means connected to said mixing means for receiving said mixed signal and displaying said pulses at an edge of the viewing screen of said receiver means.

6. The arrangement for indicating the adjusted state of the diaphragm aperture in a television camera as defined in claim 1 wherein said pulses are produced by said pulse generating means after the vertical blanking pulse in said video signal.

7. The arrangement for indicating the adjusted state of the diaphragm aperture as defined in claim 6 wherein said pulses are produced by said pulse generating means after said vertical blanking pulse and during a following five lines of the television picture.

8. The arrangement for indicating the adjusted state of the diaphragm aperture of a television camera as defined in claim 1 wherein said pulses are produced by said pulse generating means at half picture frequency and within the region defined between the ends of vertical blanking pulses, said pulses produced by said pulse generating means being also at the beginning of the horizontal blanking pulse.

9. The arrangement for indicating the adjusted state of the diaphragm aperture in a television camera as defined in claim 1 wherein said pulses are produced by said pulse generating means at half picture frequency and within the region between the ends of the vertical blanking pulses, said pulses generated by said pulse generating means being also at the end of the horizontal blanking pulse.

10. The arrangement as defined in claim 4 including switching means connected to the electrical output of said potentiometer means mechanically coupled to said diaphragm and connected to said further potentiometer means mechanically coupled to said focal length of said lens, said switching means applying alternatingly in periodic sequence said voltage representing the state of said diaphragm aperture and said voltage representing said focal length to said pulse generating means and said mixing means whereby pulses representing said diaphragm aperture and said focal length are mixed into said video signal and are simultaneously displayed by two symbols on said viewing screen.

References Cited

UNITED STATES PATENTS

| | | | |
|---|---|---|---|
| 2,566,509 | 9/1951 | Albright | 178—6.8 |
| 2,621,246 | 12/1952 | Clayden et al. | 178—5.8 |
| 2,901,664 | 8/1959 | Firmenich | 315—22 |
| 2,952,738 | 9/1960 | Akins | 178—6 X |

ROBERT L. GRIFFIN, *Primary Examiner.*

R. K. ECKERT, Jr., *Assistant Examiner.*

U.S. Cl. X.R.

178—7.2, 7.5